(12) United States Patent
Montero et al.

(10) Patent No.: US 7,222,344 B2
(45) Date of Patent: May 22, 2007

(54) METHOD AND APPARATUS FOR SCHEDULING INVALIDATION TESTS FOR HTTP SESSIONS

(75) Inventors: Gabriel G. Montero, Chapel Hill, NC (US); Srinivas Hasti, Durham, NC (US); David B. Colasurdo, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 09/822,967

(22) Filed: Mar. 30, 2001

(65) Prior Publication Data

US 2002/0143846 A1   Oct. 3, 2002

(51) Int. Cl.
    G06F 9/46    (2006.01)
    G06F 15/16   (2006.01)
(52) U.S. Cl. ....................... 718/102; 709/227
(58) Field of Classification Search ............... 709/223, 709/217, 227; 707/10; 726/3; 718/105
    See application file for complete search history.

(56) References Cited

U.S. PATENT DOCUMENTS

| 6,199,065 B1 * | 3/2001 | Kenyon ................... 707/10 |
| 6,269,330 B1 * | 7/2001 | Cidon et al. .............. 714/43 |
| 6,578,035 B1 * | 6/2003 | Barker .................... 707/10 |
| 6,715,082 B1 * | 3/2004 | Chang et al. .............. 726/8 |

* cited by examiner

*Primary Examiner*—Meng-Al T. An
*Assistant Examiner*—Camquy Truong
(74) *Attorney, Agent, or Firm*—Bruce Clay; Synnestvedt & Lechner LLP

(57) ABSTRACT

The invention is a method and apparatus for invalidating session data stored in a database. In accordance with the invention, http sessions stored in the database are allowed to remain in the database without real time testing for session time out. Instead, invalid (or timed out) sessions remain in the database until a specified time. At that specified time, all http sessions are invalidated without actually testing them for time out. Alternately, each session can be individually tested for time out and only those sessions which have actually timed out are removed from the database or otherwise invalidated.

29 Claims, 2 Drawing Sheets

METHOD AND APPARATUS FOR SCHEDULING INVALIDATION TESTS FOR HTTP SESSIONS

FIELD OF THE INVENTION

The invention pertains to hypertext transfer protocol (HTTP) and the World Wide Web (the Web). More particularly, the invention pertains to maintenance of http session data at the server side, and most particularly, to invalidation of session data when sessions time out.

BACKGROUND OF THE INVENTION

By now, almost everyone is familiar with the Internet and the World Wide Web (the Web). The Internet is a collection of interconnected communication networks that span the globe. Information content on the Internet is presented via pages, each page comprising a file that is stored on (or dynamically built by) a computer server that is coupled to the Internet and assigned a Uniform Resource Locator (URL), which is essentially an address on the Internet.

Web browsers are computer programs that enable one to access and view Web pages via direct addressing (typing the address of a Web page in an address field of the browser) and/or by hyperlinking, as is well known in the art. Netscape Navigator and Microsoft Explorer are two of the most common Web browsers in use today.

Hypertext transfer protocol (http) is the protocol used for transferring Web pages over the Internet. Servers are computers that form part of the Web and whose general purpose is to provide (or serve) information to other computers coupled to the Web. Those computers that are used to request and receive information via the Web from http servers are typically termed client machines or client computers.

On the Web, information is served in the form of Web pages written in HTML (HyperText Markup Language). Thus, for example, a retail Web site operator couples to the Internet via one or more http servers on which are stored a plurality of Web pages written in HTML programming language. In actuality, many Web pages are not actually stored in Web page format, but are dynamically constructed upon receipt of a request for the page.

The HTML code defines the manner of presentation of information on the client machine. The HTML code also typically includes the textual content of the page. Other types of content, such as images, audio, background, and multimedia are contained in separate, supplemental, files stored in the server which are referenced within the HTML code by HTML tags.

In a common example, a customer accesses a Web retailer's Web site from a desktop computer using a Web browser. The customer's desktop computer utilizing the Web browser software would be considered a client machine.

The Web browser requests a particular Web page using http in a manner well known to those of skill in the art. Upon receipt of the request for a particular Web page, the server system corresponding to the URL of the requested page serves the HTML code for that page to the client machine via the Internet.

Http is a connectionless transfer protocol. This means that each request for a Web page transmitted from a client to a server is completely freestanding and contains no information that relates that request to any other request. Thus, http itself has no provision for state information that would allow a server (or a client) to maintain historical information about a series of related http requests (e.g., consecutive requests for pages from a single Web site by a single client).

In many types of communication sessions between a particular client and a particular Web site, it may be desirable to associate http requests from a single client and maintain state information. For instance, at retail Web sites which, commonly use dynamically generated shopping cart pages to keep track of items being purchased by a particular client, maintaining state information is a necessity in order to keep track of the various products being added to the shopping cart by the user contained in different http requests. Countless other examples also exist. The term session will be used in this specification to refer to any group of requests for data from a network server system that one may wish to associate with each other. Typically, however, a session comprises requests from a single client machine to a single server system that are within a certain time period of each other. The concept of sessions is not limited to use on the Internet and http, but can be applied to any communication network using any protocol.

Accordingly, ways have been developed outside of the http protocol itself for maintaining such state (or session) information. One of the earliest ways developed for doing this was the use of cookies. Cookies are small pieces of data that a server sends to a client machine and that the client's Web browser knows to store in a designated cookie folder or in browser memory. Thereafter, when that client sends a http request for a Web page to that server, the client's Web browser software sends the cookies associated with that URL to the server. The cookie might contain any particular information that the Web site operator feels the need to have in order to better service its customers. As an example, many Web sites allow individual clients to customize Web pages, such as a daily, electronic, newspaper containing only those articles that meet certain criteria selected by the customer and which criteria are stored as part of a cookie. Cookies are a common way to allow the Web site operator to identify the particular client making a request so that the operator can then pull up the appropriate information associated with that client and deliver the customized Web page. Persons of skill in these arts will recognize that other mechanisms for storing state data and the like are known and used in the field. However, the use of cookies is probably the most ubiquitous of the various mechanism in use today.

The Javax.servlet.http.HTTPSession object in the Java programming language (commonly called HttpSession) is a newer way of maintaining state information at the server side. The Javax.servlet.http.HTTPSession object builds on cookies as well as some of the other means of tracking state data in a layer on top of the http layer. HttpSession is a portion of a Java servlet API (Application Program Interface). Java is a programming language developed by Sun Microsystems, Inc. expressly for use in the distributed environment of the Internet. It can be used to create complete applications that may run on a single computer or be distributed among servers and clients in a network. It can be used to build small application modules, known as applets, for use as part of a Web page. Applets make it possible for a Web page user to interact with a page. Applets are small programs that can be delivered to a Web browser as part of an HTML page. Web browsers that include a Java Virtual Machine (JVM) can run Java applets The applet can execute at the client side to provide dynamic content and/or allow for interactivity. For example, a Java applet can allow a user at a client machine enter data onto a form. Applets thus allow for dynamic Web pages and interaction between the user at the client machine and the downloaded Web page. Java and Java applets are platform independent.

An API is a specific method prescribed by a computer operating system or by another application program by which a programmer writing an application program can make requests of the operating system or other application.

A Java servlet essentially is a server-side equivalent of an applet. A Java servlet API provides Web developers with a simple, consistent, mechanism for extending the functionality of an http server and for accessing existing business systems, i.e., the application program with which the HTML code interfaces. Servlets are server and platform independent. HttpSession essentially is an object of a Java servlet API that accumulates state data. It is built using cookies (and/or other existing state data tracking techniques) and associates http requests with those cookies (and/or the particular data pieces used in other data tracking techniques).

For further information concerning HttpSession, Java servlet APIs and the other matters discussed above, reference can be made to the servlet 2.2 (or later) specification.

It is common for high traffic Web sites to divide the tasks of servicing requests in to a three tier system with a different server or plurality of servers to handle each tier. The first, front end tier is the http server that processes the http aspects of a transaction. The second tier is termed the application server. The application server handles the content specific processing for the transactions. For instance, in a retail Web site, the application server would process the actual data for a purchase, such as creating an invoice, creating a bill of lading, checking inventory to determine if the ordered item is in stock, checking the customer's credit card information and confirming sufficient funds, record keeping, etc. The third tier comprises database servers that store the data needed to process requests. Such databases may include, for instance, a database of inventory and a database storing the content that is used to dynamically build Web pages. Within each tier, a large volume Web site server system may have multiple, redundant, servers. Particularly, any given server can only service so many requests in a given period. If the Web site expects more traffic than a single server can handle, it simply maintains multiple servers which can serve the same content. In such situations, since http is a connectionless protocol, one request from a particular client can be directed to one application server while the next request from the same client machine might be directed to a different application server. Accordingly, a means must be provided for the various servers to access the session data developed by another, redundant server.

A common way of enabling such sharing of http session data is by use of a database server that is accessible to the plurality of application servers for storing session data. Particularly, an application server will store session data in local memory, but will also write a copy of the session data to the session database. If a different server services a request from a client, that different server can go to the database and read out the session data for the corresponding session.

Typically, the session data is updated in both the local memory and the database each time a request causes a change in the data. Particularly, the server updates the http session data in its local memory and also writes that data to the database after each request. Another method that has been used is herein termed manual update. With manual update, the servlet operator can explicitly, within the code, direct the server to write its locally stored session data to the database.

Eventually, all sessions end. For instance, the individual at the client side finishes his or her business with the Web site and either goes on visit another Web site or turns off his or her computer. The session data being maintained therefore must be invalidated at some point since it is stale data that is no longer of any value. The appropriate server-side application program may expressly make a determination as to when a session has ended. For example, a retail Web site might deem a session to have ended after a consumer checks out (and all of the business data processing needed to process the order has been completed). The appropriate application program may then expressly invalidate the session data stored in the database (among many other tasks not pertinent to the present invention that may be performed upon the closing of a session). Another common way for a session to end is for it to time out. Specifically, typically, the http server of the application server maintains a record of the time of the last http request in a session and, if period since the last request exceeds a particular threshold (herein termed the time out interval), the session is closed. At a minimum this would involve invalidating the session data in the local memory and the database and may also involve other tasks.

Traditionally, while the servers are up and running (e.g., processing http requests from client machines and writing to and reading from the http session database), invalidation testing of the session data in the session database is run in parallel. Particularly, at specified intervals, an invalidation test program wakes up and polls all of the sessions stored in the session database to determine if they have timed out. For instance, the invalidation test simply may entail, for each session stored in the database, reading the last access time and the time out interval (either or both of which may be an attribute comprising the session data itself), and compare the time out interval to the difference between the last access time and the current time. If the time out interval is shorter than that difference, the session has timed out and the test program invalidates the corresponding session data in the database.

The invalidation test for each session can involve at least one read from the session database and, if the session needs to be invalidated, at least one write (to flag the session data as invalid or delete it outright). Thus, invalidation testing entails a substantial amount of traffic at the database and substantially increases the load on the database. The additional traffic created by the invalidation testing of the session database can be particularly taxing on the system during those times of day when there already is high traffic in the server system due to a large volume of client machines accessing the server system.

Writing to the database is a particularly expensive process in terms of consumption of processing power and time. Accordingly, it is desirable to reduce the number of writes to a session database in order to conserve system resources.

It is an object of the present invention to provide an improved method and apparatus for invalidating http session data in a back-end database.

It is another object of the present invention to provide a method and apparatus for invalidating http session data in a back-end database that minimizes database traffic.

Further, it is an object of the present invention to provide a method and apparatus to avoid invalidating http session data in a back-end database during periods of high traffic.

SUMMARY OF THE INVENTION

The invention is a method and apparatus for invalidating session data stored in a database. In accordance with the invention, no real time testing for session time out and invalidation of session data for http sessions in the database is performed. Instead, the session data for timed out sessions remains in the database until a specified time. Preferably, the local copy of the http session data is still tested for time out and invalidation.

In at least one preferred embodiment of the invention, the specified time is a time when database traffic is expected to be minimal in order to minimize the possibility that the extra traffic load on the database server inherent in invalidation testing does not overstrain the system. In at least one preferred embodiment of the invention, at that specified time, all http sessions are invalidated without actually testing them for time out. Many Web site operators may be willing to accept the possibility that some sessions may not have timed out and that useful session data may be lost in exchange for the substantial decrease in database server load since this scheme could enable the Web site operator to design a much less expensive server system because the maximum load that the database must be designed to handle would be substantially lessened.

In an alternate embodiment of the invention, at the specified time, each session can be individually tested for time out and only those sessions which have actually timed out invalidated.

DETAILED DESCRIPTION OF THE INVENTION

Figure 1:
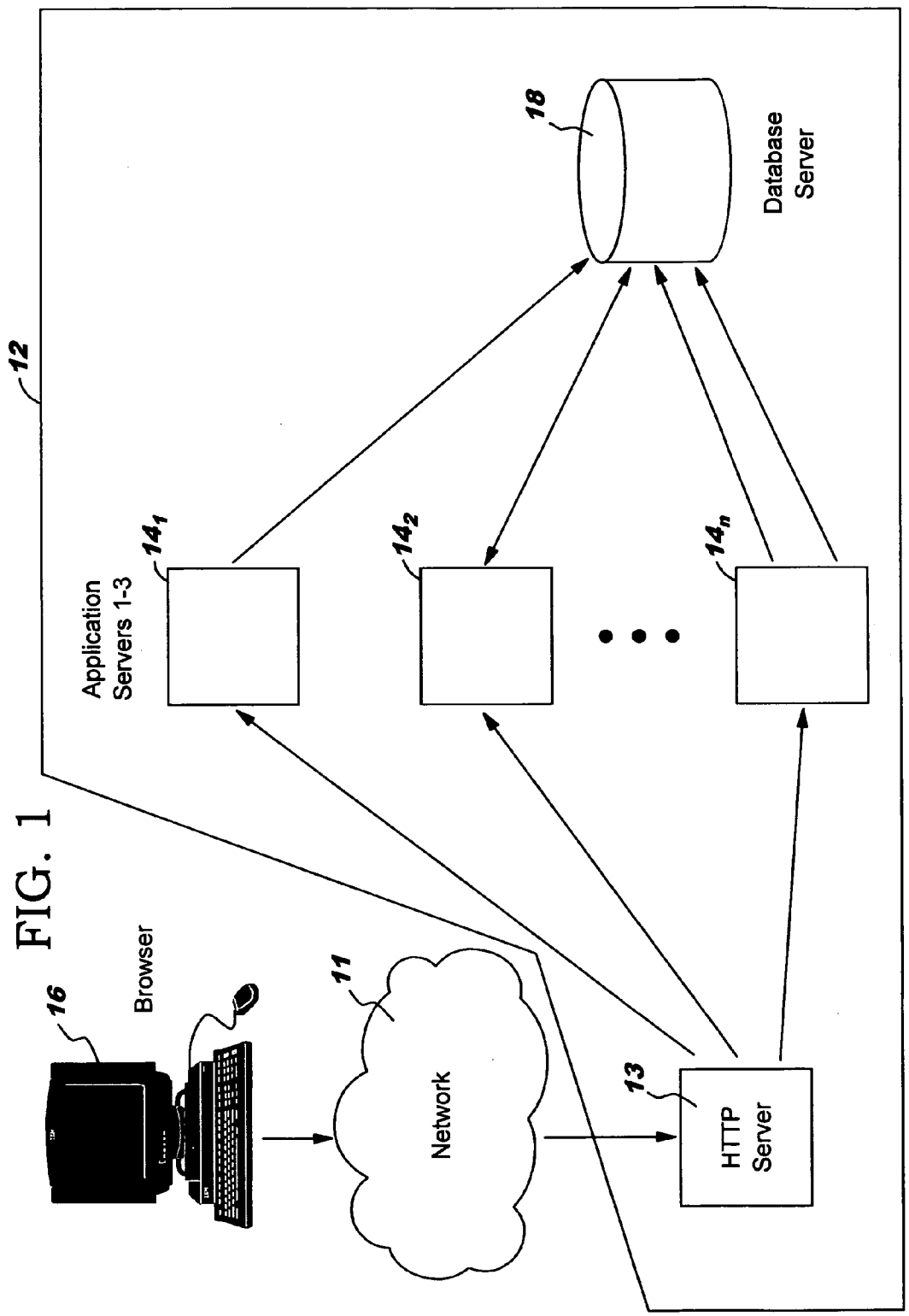
FIG. 1 is a block diagram showing a network architecture including a server system in accordance with the present invention.

FIG. 1 is a block diagram of a communication network system architecture including a server system according to a preferred embodiment of the present invention. The invention will herein be described in connection with the Internet and http. However, it will be understood by those of skill and the art that the invention is applicable to any type of distributed communication network in which copies of session data are maintained in a shared database in any manner. Further, while the invention is particularly adapted and suitable for use in connection with session data maintained in the form of HttpSession objects of Java servlet APIs in J2EE (Java™2 Platform, Enterprise Edition) it can be applied to any manner of maintaining state data for a communication session on a distributed network. Information on J2EE can be obtained from Sun Microsystems, Inc. of Palo Alto, Calif., USA.

Referring to FIG. 1, as previously noted, the Internet 11 essentially is a distributed communication network that spans the globe. A Web site operator operating a server system 12 couples to the Internet 11 through one or more http servers 13. The http server is coupled to one or more application servers $14_1$, $14_2$, . . . , $14_n$. Each application server $14_1$–$14_n$ is essentially redundant of the other application servers and is capable of serving the same content and performing the same processing tasks. In addition, the server system may include a database server 18 for storing content accessible to the application servers that may be necessary for processing the http requests.

For instance, in connection with a retail Web site that sells goods via the Internet, the http server(s) 13 handle all tasks relating to interfacing to the clients via the Internet using http, ftp, etc. The application server(s) 14 handle application processing tasks such as creating a purchase order, creating an invoice, checking stock to determine if a requested product is available, creating a shipping order, calculating tax and shipping charges, adding such charges to the price of the item being purchased, checking the validity of a credit card number used to charge for the purchase, etc. The application server(s) 14 access necessary data for performing these tasks, such as inventory data, shipping data, etc. from the database server(s) 18. The http server(s) 13 interface with the application server(s) 14 using tools such as Java servlet APIs.

In the case of a Web site that dynamically creates Web pages responsive to requests (rather than simply storing pages), the application server(s) would also perform the tasks of dynamically creating the Web pages using data stored in databases maintained in the database server(s).

An individual wishing to view Web pages via the Internet runs Web browser software on his or her computer or client machine 16. Web browsers are capable of communicating using http, ftp and other protocols. A client Web browser can issue http requests via the Internet to any particular server system for content to be presented to it in the form in HTML pages. When a server system 13 receives such a request, it returns the requested HTML page to the requesting client and creates http session data for the session. Although there are other options, in one option, Web site operators who wish to maintain session information operate Java-enabled application servers capable of running Java servlet API's, and utilize the HttpSession object to maintain the session data.

As previously mentioned, when there are multiple, redundant, application servers 14, it is possible, if not likely, that requests in a single http session may be serviced by different application servers. Accordingly, the various servers must be able to obtain the session data (e.g., the HttpSession object) for a given session that may have had previous requests serviced by a different one of the application servers. Accordingly, one of the databases maintained in the database server 18 is a session database. Data for http session handled by any of the server, $14_1$–$14_n$, is stored in the session database. Thus, when an application server handles an http request in connection with a particular session for which that server does not have a local copy of the corresponding session data (for example, because it has not serviced any of the previous requests pertaining to that session), it can go to the session database to read out the session data that was written to the database by the server that processed the previous requests in that session.

Accordingly, each server maintains a copy of the session data for each of the http sessions that it is servicing in a local memory and also writes a copy of the session data to the http session database 18. If a server switch occurs for a given session, the new server can go to the database and request the session data pertaining to that session.

In accordance with the present invention, invalidation testing of the session data stored in the database is not performed on a routine or regular basis in parallel with the processing of http requests. (Testing is still performed with respect to the locally stored copies of the http session data). Instead, in at least one preferred embodiment of the invention, all of the http sessions in the http session database are tested at one time. Preferably, that time is during a period that the traffic at the Web site is relatively low, e.g., 3:00 am in the morning. In certain embodiments, the time can be a particular time of day. In other embodiments, a process can be run periodically to determine the load on the server system or the load on the session database, and when it falls below a predetermined threshold, the session invalidation process can be run only if the load is below a certain threshold.

In one particularly preferred embodiment, at the designated time, the process simply wipes out the entire database without performing any invalidation testing. Many Web site operators may be willing to accept the possibility of losing valid and useful session data in order to have a more efficient system. For those Web site operators that are not willing to make that sacrifice, each session can be individually tested for time out at the designated time and only those that are determined to have timed out are invalidated.

Figure 2:
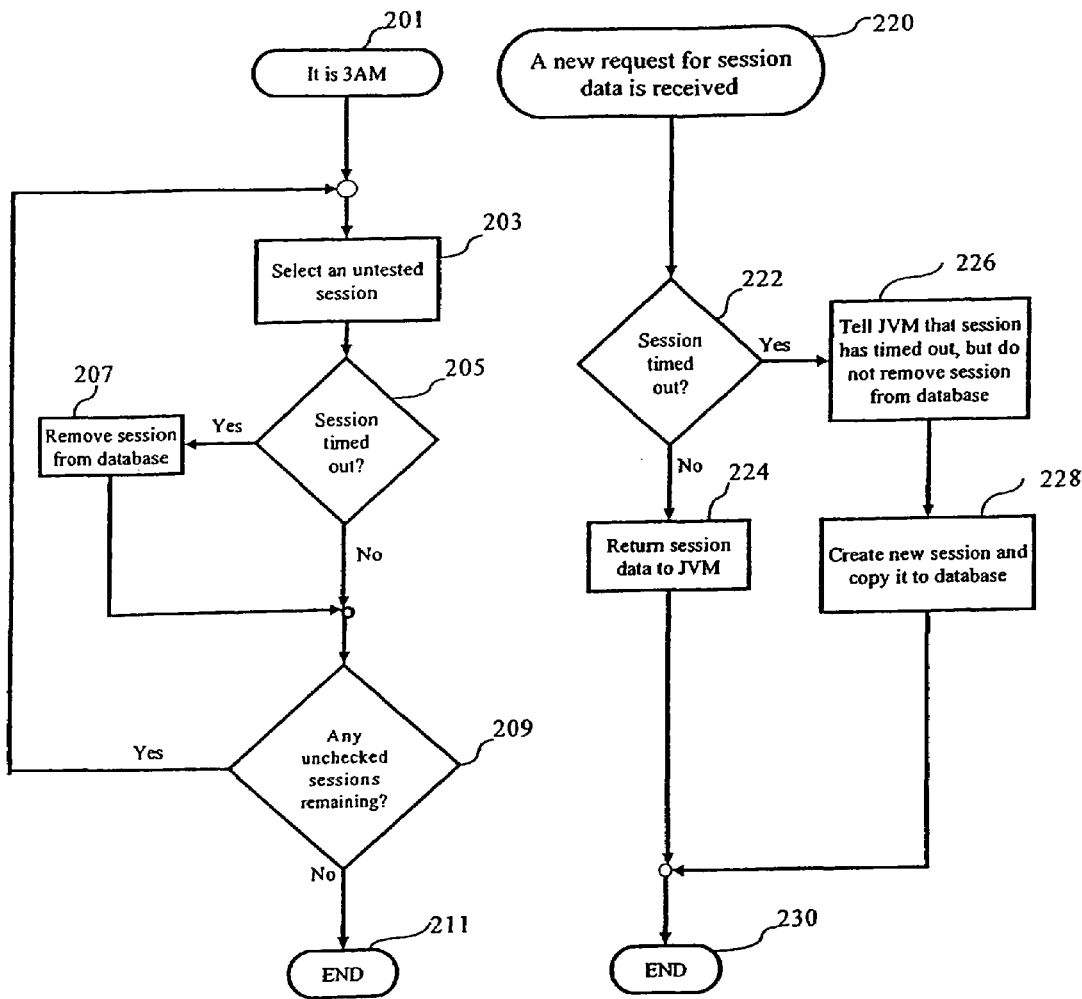
FIG. 2 is a flow chart disclosing http session invalidation in accordance with the present invention.

FIG. 2 is a flow chart illustrating an overall session invalidation scheme in accordance with the present invention.

The process starts at step 201 when it is the designated time. In this particular example, the designated time is a particular time of day, namely, 3:00 am. However, as previously noted, the time can be dynamically controlled to be a time when it is dynamically determined that the load on the server system is low. In step 203, the process selects one of the sessions that has not been tested yet. In step 205, it runs an invalidation test to determine if the session has timed out. If it has, flow proceeds to step 207 and the session data is invalidated in the database. There are many possible schemes for invalidating session data that would be well within the skill of persons in this art. One scheme would involve including a one bit valid flag as one of the attributes of the session data and resetting that flag to indicate that the session data is invalid and should not be used. Alternately, the data for the specific session is removed from the database. Then flow proceeds to step 209.

If the session has not timed out, then flow proceeds directly from 205 to step 209. In step 209, the system determines if all of the sessions in the database have been tested. If they have, the process ends at step 211. If they have not, then flow proceeds back to step 203 to flow through the test steps repeatedly until all the sessions have been tested for a time out.

As previously noted, in other embodiments of the invention, the system may simply wipe out all existing sessions in the http database without testing them, if the Web site operator is willing to accept the potential loss of data that can occur if a session that has not timed out is invalidated.

It should be borne in mind that every time a request is received for http session data, a time out invalidation test is performed. This essentially is a process that occurs independent of the present invention. Obviously, if a session has timed out, the database should not return the session data in response to the request. However, there is modification to that process in accordance with the present invention. Accordingly, FIG. 2 also illustrates the process of invalidation testing of a session in response to a request for the corresponding session data in what is essentially a parallel path (comprising steps 220, 222, 224, 226, 228, and 230).

The process starts at step 220 when a new request for session data from the session database is received. In step 222, it is determined whether the requested session has timed out. If not, flow proceeds to step 224, where the session data is returned to the requesting Java Virtual Machine. If the session has timed out, flow instead proceeds from step 222 to step 226. In step 226, the database informs the requesting JVM that the session has timed out and removes the session data from the database (or otherwise invalidates it).

In an alternate embodiment of the invention, the session data stored in the database is not touched at this time and, instead, it will be invalidated at the designated time in accordance with the present invention. Accordingly, one or more writes to the database that would normally be necessary to invalidate the session data at this time would not be performed.

Flow proceeds from step 226 to step 228 in which the server running the JVM that requested the timed out data creates new session data and writes it to the database as a new session to be added to the database.

In accordance of the present invention, the large number of reads and writes to and from the session database server that would normally be carried out in connection with invalidation testing of sessions in parallel with the regular processing of http requests is minimized or completely eliminated. This reduces the load on the server system and particularly on the http session database.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of maintaining session data in a server system serving a network, said server system including at least one network server and at least one database server, said method comprising the steps of:
   (1) storing in a memory that is local to said at least one network server, session data for a plurality of sessions serviced by said at least one network server;
   (2) storing in a database that is local to said at least one database server, copies of said session data for a plurality of sessions serviced by said at least one network server;
   (3) performing contemporaneous time out testing of particular session data stored in said memory local to said at least one network server for one of said plurality of sessions every time a request is received for said particular session data prior to utilizing said particular session data, and not invalidating a copy of said particular session data in said database even if said contemporaneous testing has indicated that the corresponding session has timed out;
   (4) performing an invalidation procedure on all said copies of said session data in said database when a load on said at least one database server is below a threshold and at a particular time that is independent of when said contemporaneous testing is performed, wherein said invalidation procedure comprises setting a one-bit flag to indicate that said session data is invalid;
   wherein said invalidation procedure comprises the steps of:
       (4.1) for each copy of said session data in said database, determining if said session has timed out;
       (4.2) for each session that has timed out, invalidating the corresponding copy of session data in said database; and
   (5) periodically determining a load on said database; and wherein said particular time is a function of said determined load and a predetermined interval.

2. The method of claim 1 wherein said session data comprises an HttpSession object of a Java servlet application program interface (API).

3. The method of claim 2 wherein said Java servlet APIs are J2EE servlet APIs.

4. The method of claim 2 wherein step (1) comprises the step of:
(1.1) creating said HttpSession object for a session upon initiation of said session.

5. The method of claim 4 wherein step (1) further comprises the step of:
(1.2) updating said HttpSession object for said sessions as said session progresses.

6. The method of claim 5 wherein said server system comprises a plurality of Java Virtual Machines (JVMs) of which different ones of said JVMs may service different http requests corresponding to a single http session and wherein said database is accessible to each of said JVMs.

7. The method of claim 6 wherein step (1) further comprises the step of:
(1.3) storing said HttpSession object for each session handled by a JVM in a memory local to a network server running said JVM;
and step (2) further comprises the step of:
(2.1) writing a copy of said HttpSession object for each session stored in said database local to said at least one database server.

8. The method of claim 7 wherein said plurality of JVMs run on a plurality of network servers.

9. The method of claim 8 wherein said server system services the World Wide Web.

10. The method of claim 1 wherein said particular time is a function of a periodic interval.

11. The method of claim 10 wherein said periodic interval is a day and said particular time is a time of day.

12. The method of claim 11 wherein said time of day is a time of day that a load on said database is expected to be low.

13. A server system serving a network comprising:
at least one network server having a local memory;
at least one database server having a database;
a first computer program adapted to store in said memory local to said at least one network server session data for a plurality of sessions serviced by said at least one network server;
a second computer program adapted to store in said database copies of said session data;
a third computer program adapted to perform contemporaneous time out testing of particular session data for one of said plurality of sessions every time a request is received for said particular session data prior to utilizing said particular session data, and further adapted to not invalidating a copy of said particular session data in said database even if said contemporaneous testing has indicated that the corresponding session has timed out;
a fourth computer program adapted to perform an invalidation procedure on all said copies of said session data in said database when a load on said at least one database server is below a threshold and at a particular time that is independent of when said contemporaneous testing is performed, wherein said invalidation procedure comprises setting a one-bit flag to indicate that said session data is invalid;
wherein, for each copy of session data in said database, said fourth program determines if said session has timed out and invalidates the copy of session data corresponding to said sessions that have been determined to have timed out; and
a computer program for determining a volume of network traffic involving said server system; and
wherein said particular time is a function of said network traffic involving said server system.

14. The system of claim 13 wherein said session data comprises an HttpSession object of a Java servlet application program interface (API).

15. The system of claim 14 wherein said Java servlet APIs are J2EE servlet APIs.

16. The system of claim 14 wherein said first program creates said HttpSession object for a session upon initiation of said session and updates said HttpSession object for said session as said session progress.

17. The system of claim 16 further comprising a plurality of Java Virtual Machines (JVMs) of which different ones of said JVMs may service different http requests corresponding to a single session and wherein said memory is accessible to each of said JVMs.

18. The system of claim 17 wherein said first program stores said HttpSession object for each session handled by a JVM in a memory local to said JVM and wherein said second program writes a copy of said HttpSession object for each http session stored in said database local to said at least one database server.

19. The system of claim 18 wherein said at least one network server comprises a plurality of network servers and wherein different ones of said JVMs run on different ones of said plurality of network servers.

20. The system of claim 19 wherein said server system services the World Wide Web.

21. The system of claim 13 wherein said particular time is a function of a periodic interval.

22. The system of claim 21 wherein said periodic interval is a day and said particular time is a time of day.

23. The system of claim 22 wherein said time of day is a time of day that network traffic involving said server system is expected to be low.

24. The system of claim 23 wherein said particular time is further a function of a predetermined interval.

25. A method of maintaining HttpSession objects in a server system serving a network, said server system including a plurality of network servers running a plurality of Java Virtual Machines (JVMs), said method comprising the steps of:
(1) storing in a memory local to a network server running a JVMs HttpSession objects for each session serviced by said JVMs;
(2) storing in a database accessible to all of said JVMs copies of said HttpSession objects for each session serviced by said JVMs;
(3) performing contemporaneous time out testing of a particular HttpSession object every time a request is received for said particular HttpSession object prior to utilizing said particular HttpSession object, and not invalidating a copy of said particular HttpSession object in said database even if said contemporaneous testing has indicated that the corresponding session has timed out;
(4) performing an invalidation procedure on all said copies of said HttpSession objects when a load on said at least one database server is below a threshold and at a particular time that is independent of when said contemporaneous testing is performed, wherein said invalidation procedure comprises setting a one-bit flag to indicate that said session data is invalid;

wherein said invalidation procedure comprises the steps of:
  (4.1) for each copy of an HttpSession object in said database, determining if said corresponding session has timed out; and
  (4.2) invalidating each copy of an HttpSession object in said database that has timed out; and
(5) determining a volume of network traffic involving said server system; and
wherein said particular time is a function of said network traffic involving said server system.

26. The method of claim 25 wherein said HttpSession objects conform to the J2EE servlet APIs.

27. The method of claim 26 wherein step (1) comprises the steps of:
  (1.1) creating said HttpSession object for a session upon initiation of said session and storing said HttpSession object in a memory local to a particular one of said JVMs upon initiation of said session;
  (1.2) updating said HttpSession object for each said http session in said local memory as said session progresses and wherein step (2) comprises the steps of:
  (2.1) writing a copy of said HttpSession object for each session stored in said local memory to said database upon said creation;
  (2.2) updating said copy of said corresponding HttpSession object in said database as said session progresses.

28. The method of claim 26 wherein said particular time is a function of a periodic interval.

29. The method of claim 28 wherein said periodic interval is a day and said particular time is a time of day when network traffic involving said server system is expected to be low.

* * * * *